United States Patent

Ozanne et al.

(10) Patent No.: US 8,919,240 B2
(45) Date of Patent: Dec. 30, 2014

(54) IDENTIFICATION OF BEVERAGE INGREDIENT CONTAINING CAPSULES

(75) Inventors: Matthieu Ozanne, Champanges (FR); Didier Vuagniaux, Gimel (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/518,309

(22) PCT Filed: Dec. 20, 2010

(86) PCT No.: PCT/EP2010/070266
§ 371 (c)(1),
(2), (4) Date: Jun. 21, 2012

(87) PCT Pub. No.: WO2011/076748
PCT Pub. Date: Jun. 30, 2011

(65) Prior Publication Data
US 2012/0255448 A1  Oct. 11, 2012

(30) Foreign Application Priority Data
Dec. 21, 2009 (EP) .................................. 09180092

(51) Int. Cl.
A47J 31/40 (2006.01)
A47J 31/36 (2006.01)
A47J 31/44 (2006.01)

(52) U.S. Cl.
CPC .......... *A47J 31/3685* (2013.01); *A47J 31/4492* (2013.01)
USPC ............................................. 99/280; 99/295

(58) Field of Classification Search
CPC ..... A47J 31/02; A47J 31/047; A47J 31/0642; A47J 31/3623; A47J 31/4492; A47J 31/52; A47J 31/56; A47J 2031/0694
USPC ....... 99/280, 281, 282, 283, 285, 289 R, 295; 426/77, 87, 115, 232, 383, 394
See application file for complete search history.

(56) References Cited

U.S. PATENT DOCUMENTS 3,793,933 A * 2/1974 Weber .............................. 99/283
2005/0013511 A1 * 1/2005 Lin .................................... 383/3
(Continued)

FOREIGN PATENT DOCUMENTS

GB 2191167 A * 12/1987
JP 2001043768 2/2001
(Continued)

OTHER PUBLICATIONS

International Search Report issued Apr. 1, 2011 for corresponding Intl. Appln. No. PCT/EP2010/070266.
(Continued)

*Primary Examiner* — Dana Ross
*Assistant Examiner* — Brandon Harvey
(74) *Attorney, Agent, or Firm* — K&L Gates LLP

(57) ABSTRACT

The invention concerns a beverage production system comprising beverage ingredient containing capsules (1) comprising an identification member (6) and a beverage production machine for receiving said capsules, said machine comprising:—contact means (8) for physically contacting the capsule identification member (6) in order to read information thereof and—control means connected to the contact means and designed to control the operation of the beverage production machine (11) in response to the read information, the contact means (8) comprising:—at least one displaceable probe (81) which mechanically contacts the capsule identification member (6),—a resilient support member (82) in contact with the probe on one side and associated to a circuitry (9) on its other side, the parts of said resilient support member in contact with the probe presenting a shape able to be deformed,—discrete conductive parts (121) between the resilient support member (82) and the circuitry (9), wherein the contact means (8) comprises a waterproof material layer (12) between the resilient support member (82) and the discrete conductive parts (121).

10 Claims, 4 Drawing Sheets

(56) References Cited

U.S. PATENT DOCUMENTS

| | | | |
|---|---|---|---|
| 2008/0081444 A1 | 4/2008 | Lee | |
| 2008/0296134 A1* | 12/2008 | Hattori et al. | 200/302.1 |
| 2009/0279269 A1 | 11/2009 | Shiue | |

FOREIGN PATENT DOCUMENTS

| | | |
|---|---|---|
| JP | 2002367469 | 12/2002 |
| JP | 2004342601 | 12/2004 |
| WO | 2008060936 | 5/2008 |
| WO | 2008/090122 A2 | 7/2008 |
| WO | WO 2008090122 A2 * | 7/2008 |

OTHER PUBLICATIONS

Written Opinion issued Jun. 26, 2012 for corresponding Intl. Appln. No. PCT/EP2010/070266.

* cited by examiner

IDENTIFICATION OF BEVERAGE INGREDIENT CONTAINING CAPSULES

CROSS REFERENCE TO RELATED APPLICATIONS

The present application is a National Stage of International Application No. PCT/EP2010/070266, filed on Dec. 20, 2010, which claims priority to European Patent Application No. 09180092.0, filed on Dec. 21, 2009, the entire contents of which are being incorporated herein by reference.

The present invention relates to the identification of a capsule by a beverage production machine.

WO 2008/090122 describes a beverage ingredient capsule that is provided with an identification member designed for being physically contacted from outside in order to control operation parameters of an associated beverage production machine. The identification member presents holes or recesses that correspond to a binary code state (0 or 1). Preferably the identification member is not visible from outside as it is covered by cover means. The beverage production machine comprises displaceable probe that can penetrate, deform, displace the cover means at regions susceptible to present holes or recesses. The degree of displacement of the probes in response to its contact with a hole or a recess is associated with information concerning the capsule. The displaceable probes are resiliably positioned at a distance of a circuitry of the machine control means and are selectively moved into contact with said circuitry depending on their contact with the recesses or the holes. The contact of the probe and circuitry also constitutes a binary code (0 or 1). The displaceable probes are resiliably positioned at a distance of the circuitry trough a resilient support member associated to the circuitry for both providing the elasticity to the probe to enable its return into a non-contact position and the insulation of the circuitry from the humidity coming from the capsule. The resilient support member can be an elastomeric, preferably silicone member. The probes can be formed of pins which have a base embedded or inserted in a seat of the support member. The control means can be designed to control, in response to the read information, a beverage production condition such as for example the temperature of a liquid supplied to the interior of the capsule.

With this kind of machines, it has been noticed that after the production of more than 2000 beverages, humidity can pass other the resilient support member even if it is made of a silicone material. This humidity affects the circuitry of the machine control means which leads to a wrong identification of the capsule.

A problem to solve is then to provide a machine with identification means such as described above in which humidity from the beverage preparation process is prevented from entering into contact with the circuitry of control means.

According to a first aspect, the invention concerns beverage production system comprising beverage ingredient containing capsules comprising an identification member and a beverage production machine for receiving said capsules, said machine comprising:

contact means for physically contacting the capsule identification member in order to read information thereof and
control means connected to the contact means and designed to control the operation of the beverage production machine in response to the read information,
the contact means comprising:
at least one displaceable probe which mechanically contacts the capsule identification member,
a resilient support member in contact with the probe on one side and associated to a circuitry on its other side, the parts of said resilient support member in contact with the probe presenting
a shape able to be deformed,
discrete conductive parts between the resilient support member and the circuitry,
wherein the contact means comprises a waterproof material layer between the resilient support member and the discrete conductive parts.

In the system of the present invention the capsule is provided with an identification member designed for being physically contacted from outside. Thus the identification members code the information in a structural manner (in contrast to a visual bar code). More precisely, the identification member can comprise a plurality of predetermined localized contact surface receivers, each of them constituting a choice amongst two different surface levels that correspond upon a contact being established or not, with an external probe member, a binary code state (0 or 1). A surface level can correspond, for example, to a difference in depth or height of a plurality of localized recesses/holes or protruding members. In an embodiment, first and second contact receivers are provided. First contact receivers can be holes or recesses of a same depth whereas second contact receivers are holes or recesses of shorter depth or, alternatively, are filled or slightly in relief. In a possible variant, first contact receivers are protruding elements of same height whereas second contact receivers are protruding elements of greater height. Preferably the identification member is not visible from outside and is not exposed to the exterior before being physically contacted by associated probe means of the beverage production machine. To this regard the identification member can be covered to the outside by cover means, wherein the cover means and/or the identification member are designed to be transferable from a cover state to an identification reading state, e.g. by being penetrated, deformed, displace by probe means from an associated beverage production machine. Preferably the identification member is coded by modulating a surface structure of a face of the capsule, e.g. by providing holes or recesses in an identification face of the capsule. The identification face of the capsule can be covered by a displaceable, deformable or puncturable membrane such as a plastic layer, an aluminium layer or a laminate of plastic-aluminium. The cover thus is designed to be selectively perforated from outside or deformed at portions overlapping the recessions or holes. On the other hand, the cover can resist at least a certain penetration or deformation by being supported at regions which are not overlapping recessions or holes. Alternatively also the cover member can remain unchanged, but the identification member can be manipulated (e.g. displaced) in order to transfer the capsule from the identification-cover state to the identification-reading state. In a preferred embodiment, the identification member can be formed in the front of a lid of the capsule which is associated to a cup-shaped body of the capsule to demarcate a cavity containing beverage forming ingredients. The identification member can be formed as an integral part of the lid. For instance, the lid can be made of a moulded plastic onto which the identification means are moulded. For limiting the space required for the detection system, the plurality of predetermined localized contact receivers can be arranged on the front of the lid in a non-linear pattern. For instance, the receivers can be grouped in a substantially polygonal, star-shaped or curved pattern or a non-regular substantially closed pattern covering the surface of the lid.

According to the invention, the beverage production machine is designed for use with the hereabove beverage ingredient containing capsule. The beverage production machine is equipped with means for physically contacting the capsule in order to read information thereof. Further on, the beverage production machine is provided with control means which are connected with the contact means and are designed to control operation parameters of the beverage production machine in response to the read information.

The contact means comprise at least one displaceable probe which mechanically contacts the capsule identification member. The control means are initially arranged with the at least one probe to detect an identification information in relation to the degree of displacement of the probe in response of its contact with the capsule identification member. More particularly, the at least one displaceable probe is resiliably positioned at a distance of a circuitry of the control means and is selectively moved into contact with said circuitry depending on its contact with the capsule wherein the contact of the probe and circuitry constitutes a predetermined binary coded state (0 or 1) and the non-contact of the probe and circuitry constitutes the other binary coded state.

The probes can further be formed of pins which have a base. The base is preferably resting on the resilient support member. The tip of the probe can aim at piercing the cover overlying the identification member. The contact means comprise a plurality of identical displaceable pins for contacting a plurality of predetermined localized contact receivers of the capsule.

The contact means also comprises a resilient support member that is in contact with the at least one probe on one side and that is associated to a circuitry on its other side. The parts of the resilient support member in contact with the probe presents a shape able to be deformed. This resilient support member provides the elasticity to the probe to enable its return into a non-contact position and the insulation of the circuitry from a part of the humidity coming from the capsule. The resilient support member can be, for instance, an elastomeric member, preferably made of silicone or of an EPDM rubber (ethylene propylene diene monomer). Since the resilient support member is associated to a circuitry on its other side, the displacement of the probe can be made such that it selectively opens an associated contact of a circuitry of the control means. In order to significantly reduce the size of the identification system, the identification circuitry can be a printed circuitry. The printed circuitry can be of a width of a few millimeters only and inserted in a small space of the machine adjacent the housing of the capsule. For instance, thickness of the printed circuitry is of 0.5 to 3 mm. The printed circuitry comprises for instance, a plurality of printed circuits which are selectively closed or opened by a plurality of the probes to provide the coded state.

According to the invention, the contact means also comprises a waterproof material layer between the resilient support member and the discrete conductive parts. This layer is preferably sufficiently large to cover all the parts of the resilient support member in contact with the probe. This layer is preferably deformable so that the movement or deformation of the parts of the resilient support member in contact can be transmitted to the electronic conductive elements through the layer. This waterproof material layer can be made of a material selected in the list of silicone, plastic, aluminium or a laminate of plastic-aluminium. The discrete conductive parts usually present a shape able to close the circuitry when they are pushed against areas of the circuitry which can be short-circuited.

According to a first mode, the electrical conductive elements can be fixed on the waterproof material layer. In this mode, the discrete conductive parts are fixed on the side of the waterproof material layer facing the circuitry. In the preferred embodiment of this mode, the waterproof material layer is made of an elastomeric member, preferably a silicone or an EPDM rubber, and the discrete electrical conductive parts are made of graphite. These graphite parts can be printed on the layer of the elastomeric member.

According to a second mode, the discrete electrical conductive pieces are stuck on a film and the waterproof material layer is placed between the resilient support member and the film. In this second mode the film can be a simple plastic film that eventually presents some small holes for letting air passes through. In this mode the waterproof material layer is selected in the list of laminates of PET/aluminium/PP, PE/EVOH/PP, PET/Metallised/PP, aluminium/PP. The discrete conductive parts are fixed on the side of the film facing the circuitry.

The control means is designed to control, in response to the read information, a beverage production condition such as for example the temperature of a liquid supplied to the interior of the capsule. The contact means can comprise a plurality of displaceable pins forming a predetermined pattern which mechanically selectively contact the predetermined localized surface receivers of the capsule. The control means can be designed to detect the identification information via the degree of displacement of the pin against the capsule. Preferably the control means is designed to control a beverage production temperature and/or a brewing pause time in response to the read information. In particular, the control means are designed to vary water temperature parameters, flow rate and/or brewing pause time in the brewing of different brewed tea beverages according to capsules containing leaf tea ingredients having different characteristics and/or origins.

The beverage production machine can be designed to produce tea, coffee and/or other beverages.

The implementation of the invention enables an improved isolation of the circuitry from the humidity created at the capsule side. The system of the present invention has been used fro producing more than 6000 beverages without facing any humidity issue.

BRIEF DESCRIPTION OF THE DRAWINGS

The characteristics and advantages of the invention will be better understood in relation to:

As shown in FIG. 1 the capsule has a dedicated compartment for containing beverage ingredients 5. A liquid 3, controlled by a control unit 10 of the beverage production machine 11, is made to enter the capsule 1 in order to interact with the ingredients 5 contained therein. The result of the interaction, i.e. a produced beverage or liquid comestible, can then be obtained 4 from the beverage production machine 11. Typical examples for the nature of the interaction between the liquid 3 and the ingredients 5 are brewing, mixing, extracting, dissolving etc. Different types of ingredients can be present in the beverage compartment and different types of interactions can take place in the capsule. The system as shown in FIG. 1 is provided with means for retrieving ("reading") identification data from the capsule 1 in order to transfer the read identification data to the control unit 10, such that the control unit 10 can control the operation of a following production cycle of the beverage production machine 11 depending on the content of the read identification data. The identification data can refer to parameters of the capsule and/or the ingredients. The capsule 1 according to the present invention is provided with an identification member 6 which carries, in a coded manner, identification information. Preferably the information is coded by a modulation of the surface structure of a face of the capsule 1. e.g. a hole or a recession can represent one logical sate (e.g. "0"), while another surface state ("no recession" or "no hole") can represent the other logical state (e.g. "1"). Preferably the identification member 6 is arranged at the capsule 1 such that it is not exposed to and usually not visible from outside. To this regard a cover 7 can be provided for the identification member 6. The cover 7 serves for aesthetic and/or protective purposes with regard to the identification member 6. The cover 7 and the identification member 6 are part of the capsule and arranged such that at the beginning the identification member is in a protected state. Contact means 8 of the beverage production machine can then manipulate the system cover means/identification member such that the system cover means/identification member is transferred from a covered state to an identification reading state in which the probe means can read visually or through mechanical contact the information encoded in the identification member. The manipulation can take place with regard to the identification member 6 and/or the cover means 7. Preferably the cover 7 is only carrying out the complete covering function as long as no detection process has been carried out. Along with the detection process, as will be explained later on, the cover 7 can be e.g. at least partially removed, displaced, deformed or perforated. Alternatively the cover 7, during the information reading process, is deflected in order to follow the surface contours of the identification member arranged below the cover. To this regard a flexible cover 7 can be foreseen which can be deflected from outside in order to read the surface structure of the identification member 6 arranged below the cover 7. The beverage production machine 11 is provided with contact means 8 which are designed to read the information coded by modulating the surface structure of the identification member 6. Preferably such detection is carried out by means of a physical mechanical contact. To this regard the contact means 8 can preferably comprises a plurality of displaceable pins 81, which during the information reading process are biased against the identification member 6 of the capsule 1. Depending on the specific shape of the surface structure of the identification member 6 at the contact area between a pin 81 in the identification member 6, a pin 81 will thus be allowed to protrude more or less towards the capsule 1.

Figure 1:
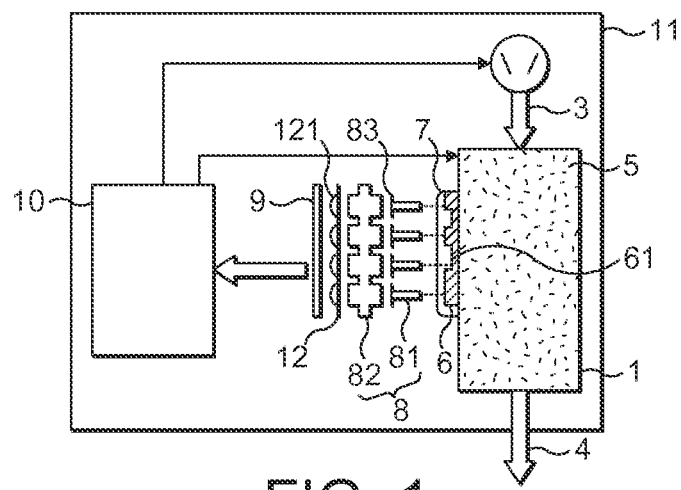
FIG. 1 showing a schematic overview of a system according to the first mode of the present invention designed for reading identification information from a beverage ingredient containing capsule.

The pins 81 are isolated from an electronic circuitry board 9 by means of a resilient support member 82 preferably made of an electrically isolating material layer, such as e.g. silicone. This member 82 will thus provide the necessary biasing force in order to slightly press the pins 81 towards the capsule and eventually perforate or deform any cover provided on top of the identification member of the capsule. Each pin 81 can be provided with a flange 83 which is in contact with a part of the support member 82. The pins are preferably more rigid than the resilient support member 82. The pins can be made of metal or hard plastic. The relative displacement of the pins 81 is transmitted to a resilient support member 82 in contact with the pins 81 on its front side. The resilient support member 82 is associated on its back side to a circuitry 9. The mechanical displacement of the pins is then converted into electronic signals. The thus generated electrical detection signals can then be processed by the control unit 10. The control unit 10 will then set, as a function of the read identification data from the capsule, parameters of the beverage production process, such as for example (non-exhaustive list) the flow rate and temperature of the supplied liquid 3 as well as the interaction time etc.

In the state shown in FIG. 1 only one depicted pin 81 faces a hole 61 of the identification member 6. Thus during the reading this specific pin is not pushed rearwards and thus not activating electrical micro-switches designed to selectively produce electrical short circuits of dedicated portions of a printed circuit board 9. On the contrary the three other pins do not face holes in the identification member 7 and then are not allowed to further slide into the surface structure of the identification member 7, they will thus be slightly pushed rewards (to the left inside FIG. 1) thus pushing the parts of the resilient support member 82 silicone material in contact with their flanges 83 to activate (i.e. transfer in the conducting state) an electrically conducting micro switch towards the printed circuit board 9. To this regard electrical conductive elements 121 are inserted between the resilient support member 82 and the printed circuit board 9 which can selectively produce a defined short circuit on the printed circuit board 9, the defined short circuit corresponding to closing a switch. The electrical conductive parts 121 are positioned at the places facing the deformable parts of the resilient support member 82 and the areas of the printed circuit board 9 which can be short-circuited. Besides according to the first mode of the present invention, the electrical conductive parts 121 are fixed on a waterproof material layer 12.

Figure 2:
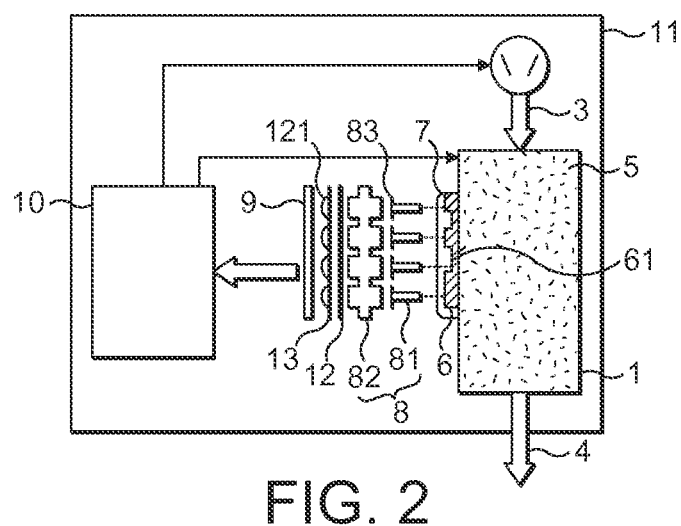
FIG. 2 showing a schematic overview of a system according to the second mode of the present invention.

FIG. 2 shows the same beverage production machine as in FIG. 1 except that the discrete conductive parts 121 are stuck on a film 13. This film helps for positioning said parts 121 in front of the areas of the printed circuit board 9 which can be short-circuited. The machine also comprises a waterproof material layer 12 between the resilient support member 82 and the film 13.

Figure 3:
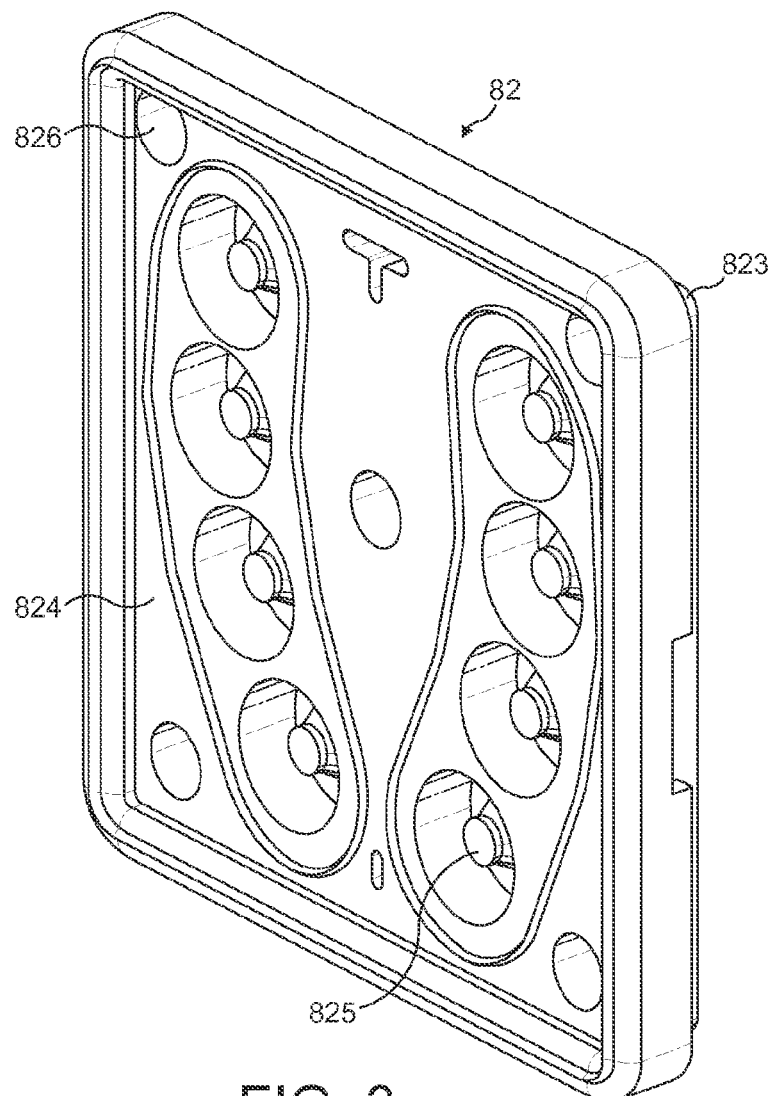
FIG. 3 showing perspective view of a resilient support member that can be used in the system of the present invention.

FIG. 3 describes a resilient support member 82 that can be implemented in the present invention. This resilient support member 82 is a flat sheet 823 of a resilient material presenting six parts able to be contacted by the probe means on its hired side 821 associated to the circuitry 9 on the present illustrated side 824. On this side the six parts 825 able to be associated to areas 91 of the circuitry 9 which can be selectively short-circuited.

Figure 4:
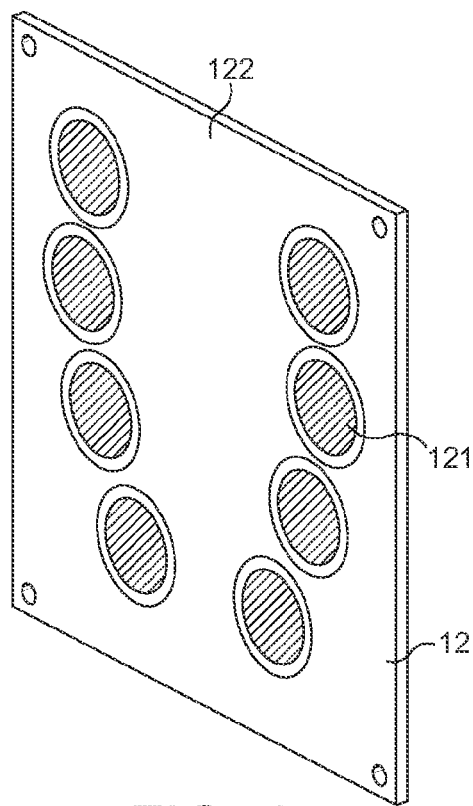
FIG. 4 showing perspective view of a layer according to the first mode of the present invention, FIG. 5 showing a printed circuit board which can be associated with the probe means.

FIG. 4 illustrates the first mode of the present invention where the discrete conductive parts 121 are fixed on the waterproof material layer 12. The six electrical conductive elements 121 are made of a conductive material, preferably graphite, that is deposited on the six parts of the layer 12 facing the areas of the circuitry which can be short-circuited on the present illustrated side 122 and the parts of the resilient support member in contact with the probe presenting a shape able to be deformed on the other hired side. Graphite can be printed on the silicone. On the side facing the circuit, these six parts can be slightly set back from the side surface so that no contact is established with the circuit unless a pin pushes the resilient support member and consequently the layer at the level of one of the six electrical conductive elements 121. This layer is preferably made of an elastomeric member, preferably a silicone or an EPDM rubber.

Figure 5:
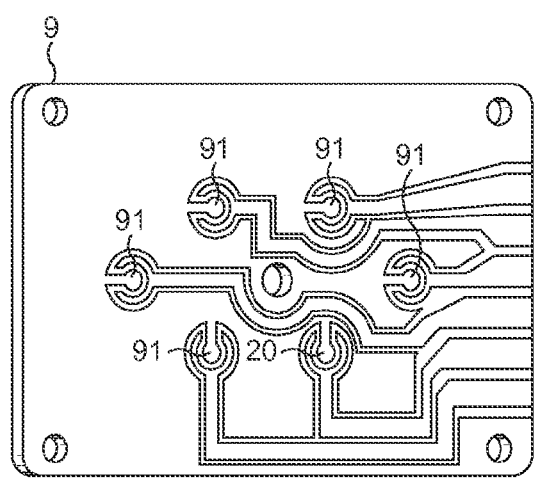

FIG. 5 shows more details of the printed circuit board 9 that can be used in the present invention. The reference numeral 91 designates those areas which can be selectively short-circuited.

Figure 6:
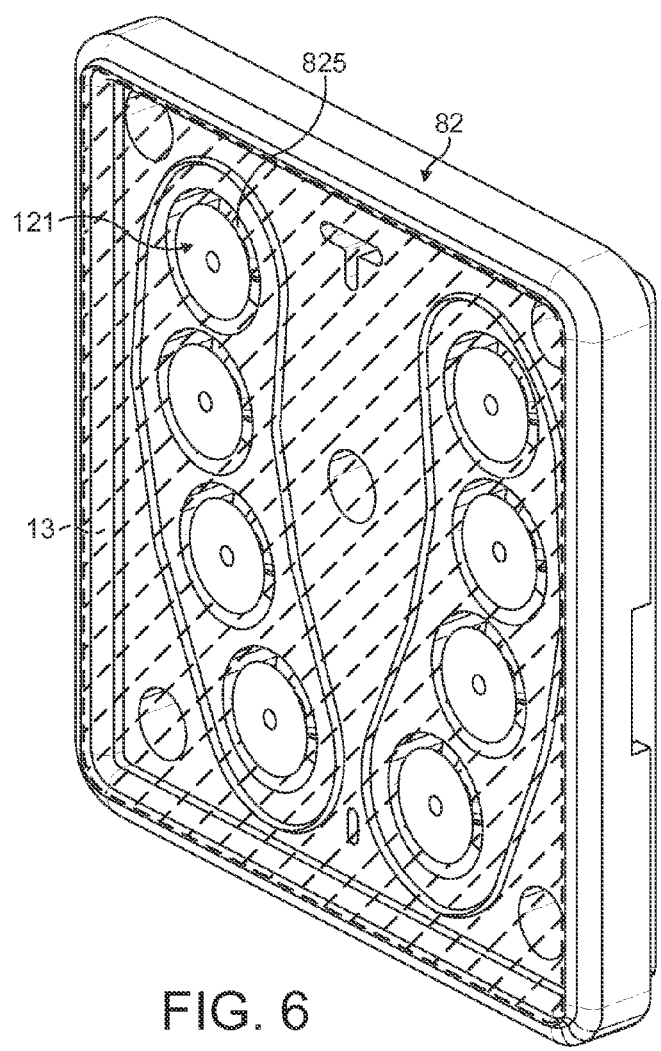
FIG. 6 showing a perspective view of the resilient support member and conductive means stuck on a film according to the second mode of the present invention, Generally it is an aspect of the present invention that a beverage production machine 11 is designed to produce a beverage from a capsule 1 positioned at a dedicated beverage production position of the beverage production machine 11.

FIG. 6 completes the description of the second mode of the present invention such as described in FIG. 2 by illustrating how the discrete conductive parts 121 are positioned between the resilient support member 82 and the circuitry. These discrete conductive parts 121 are fixed on a film 13 (illustrated in dotted points); the discrete conductive parts are fixed on the side of the film 13 facing the circuitry so as to be able to contact the circuitry. The movements of the cones 825 of the resilient support member 82 induce the movements of these conductive parts 121 so that they contact the areas of the circuitry that can be short-circuited. The waterproof material layer is not illustrated in FIG. 6 and would be placed between the film 13 and the resilient support member 82.

The invention claimed is:

1. A beverage production system comprising:
   beverage ingredient containing capsules comprising an identification member; and
   a beverage production machine for receiving the capsules, the machine comprising a contact for physically contacting the capsule identification member in order to read information thereof, and a controller connected to the contact and designed to control the operation of the beverage production machine in response to the read information, the contact comprising:
   at least one displaceable probe which mechanically contacts the capsule identification member,
   a resilient support member in contact with the probe on one side and associated to a circuitry on its other side, parts of the resilient support member in contact with the probe presenting a shape able to be deformed, the resilient support member including deformable cones on the side which is associated to the circuitry;
   discrete conductive parts between the resilient support member and the circuitry, the discrete conductive parts facing the deformable cones of the resilient support member and areas of the circuitry that can be short-circuited, the resilient support member configured such that movements of the cones induce movements of the discrete conductive parts to contact the areas of the circuitry that can be short-circuited, and the discrete conductive parts are on a film that is a plastic material that presents holes through which air passes; and
   a waterproof material layer between the resilient support member and the film and positioned on an opposite side of the film from the discrete conductive parts.

2. The beverage production system according to claim 1, wherein the waterproof material layer is made of a material selected from the group consisting of silicone, plastic, aluminium and a laminate of plastic-aluminium.

3. The beverage production system according to claim 1, wherein the discrete conductive parts present a shape able to close the circuitry when they are pushed against areas of the circuitry which can be short-circuited.

4. The beverage production system according to claim 1, wherein the discrete conductive parts are fixed on the waterproof material layer.

5. The beverage production system according to claim 4, wherein the discrete conductive parts are fixed on the side of the waterproof material layer facing the circuitry.

6. The beverage production system according to claim 4, wherein the waterproof material layer is made of an elastomeric member and the discrete conductive parts are made of graphite.

7. The beverage production system according to claim 1, wherein the waterproof material layer is made of a silicone or an EPDM rubber.

8. The beverage production system according to claim 1, wherein the film, the waterproof material layer between and the resilient support member are oriented vertically in the beverage production machine.

9. The beverage production system according to claim 1, wherein the waterproof material layer is selected in the group consisting of laminates of PET/aluminium/PP, PE/EVOH/PP, PET/Metallized/PP, and aluminium/PP.

10. The beverage production system according to claim 8, wherein the discrete conductive parts are fixed on the side of the film facing the circuitry.

* * * * *